Sept. 20, 1960  G. B. LONG  2,953,357
REFRIGERATOR WITH HEATING MEANS
Filed Aug. 27, 1956

INVENTOR.
George B. Long
BY
Edwin S. Dybvig
_HIS ATTORNEY

United States Patent Office 2,953,357
Patented Sept. 20, 1960

2,953,357
REFRIGERATOR WITH HEATING MEANS

George B. Long, Dayton, Ohio, assignor to General Motors Corporation, Detroit, Mich., a corporation of Delaware Filed Aug. 27, 1956, Ser. No. 606,425

1 Claim. (Cl. 257—291)

This invention relates to refrigerating apparatus and more particularly to apparatus for destroying food odors within a food storage compartment of a refrigerator.

An object of this invention is to provide a refrigerator storage compartment with a catalytic member that operates to destroy food odors that come in contact with the catalytic member.

Another object is to provide a heating element for a butter compartment of a refrigerator, the heating element being arranged to heat a catalytic odor destroyer.

A further object is to provide a refrigerator with air circulating means that is arranged to circulate air in the food storage compartment of the refrigerator over a food odor removing device.

Further objects and advantages of the present invention will be apparent from the following description, reference being had to the accompanying drawings, wherein a preferred form of the present invention is clearly shown.

Figure 1:
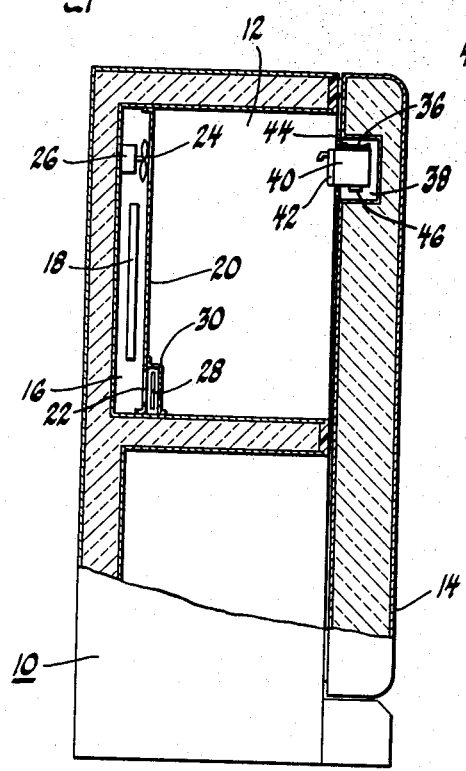
Figure 1 is a side view with parts broken away of a refrigerator having a food odor destroying apparatus made in accordance with this invention.

The method of food odor elimination of this invention contemplates passing the air within the food storage compartment of a refrigerator over a catalytic member which when heated oxidizes the food odors to destroy the same. The apparatus for food odor removal may be arranged with a refrigerator as shown in Figure 1. In this figure a refrigerator having a cabinet generally denoted by reference numeral 10 is provided with a food storage compartment 12 and with a front door 14 that closes the front opening of the food storage compartment. An evaporator compartment 16 containing an evaporator 18 is defined in part by a wall 20 that separates the evaporator compartment 16 and food storage compartment 12. The evaporator 18 is connected with conventional refrigeration equipment (not shown) in a manner that is well known to those skilled in the art.

The evaporator compartment 16 is connected with the food storage compartment 12 by a pair of openings 24 and 22 located respectively near the top and bottom of the food storage compartment. An electric motor driven fan or blower 26 is located in alignment with the opening 24 and operates to pull air into evaporator compartment 16 through opening 22 and to push air into food compartment 12 via opening 24. The air in traversing the above outlined path passes over the evaporator 18 where it is cooled.

Figure 3:
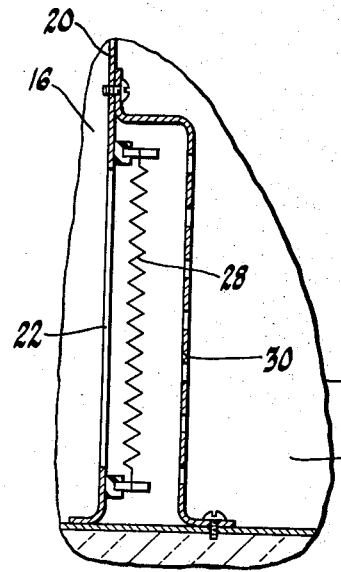
Figure 3 is an enlarged view of the catalytic compartment located in the lower portion of the food compartment of the refrigerator shown in Figure 1.

An electrical heating element 28 coated with a suitable catalytic substance is located in front of opening 22 within the food compartment 12. The heating element is protected by a perforated metal grille 30 as more particularly shown in Figure 3. The heating element 28 is preferably fabricated by coating a Nichrome wire 32 with a layer 34 of catalytic substance such as platinum or the like as more particularly shown in Figure 5. When the heating element 28 is connected with a suitable voltage supply the Nichrome wire is heated to in turn heat the catalytic substance coated thereon. With the catalytic substance hot, food odors circulating with the air in food storage compartment 12 and passing over the catalytic coated heating element 28 are effectively destroyed due to oxidation of the food odors which are essentially hydrocarbons. It will be apparent to those skilled in the art that the heating element 28 might be placed at other points within the food storage compartment 12 to destroy food odors therein in so far as certain aspects of the invention are concerned.

Figure 5:
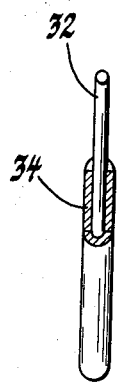
Figure 5 is a view with parts broken away of the catalytic odor eliminator of this invention.

A second electrical heating element 36 having a coating of a catalytic substance as shown in Figure 5 is located in a cavity 38 formed in the inner wall of door 14. A butter compartment 40 is located within cavity 38 and is provided with a front door 42. The butter compartment is maintained at some predetermined temperature above that existing in food compartment 12 by heat being transferred to the butter compartment from heating element 36. The cavity 38 is provided with a perforated grille 44 having portions located above and below compartment 40. With this arrangement air being forced into food storage compartment 12 by fan 26 is also blown into and out of cavity 38. This air in passing through cavity 38 passes over catalyst coated heating element 36. When the heating element is heated by electrical current the food odors in the air are destroyed by oxidation due to the catalytic coating of heating element 36.

Figure 4:
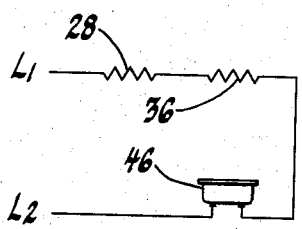
Figure 4 is a schematic electrical circuit diagram of the odor destroying mechanism shown in Figure 1.
Figure 2:
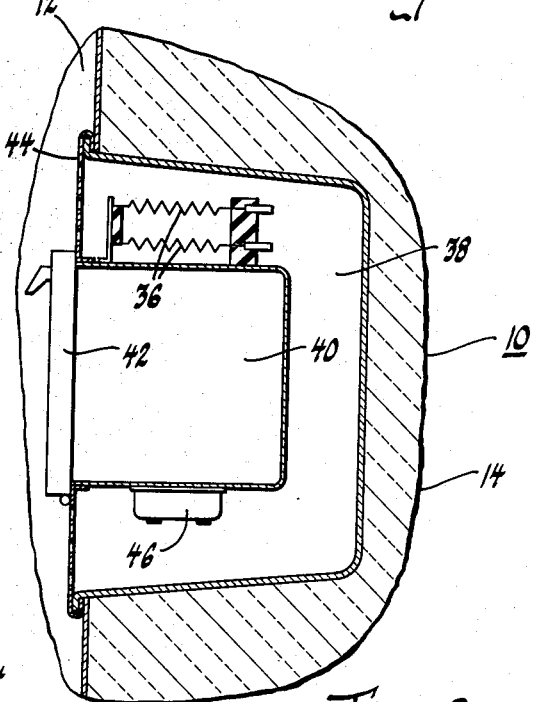
Figure 2 is an enlarged view of the butter keeper and odor destroyer shown in Figure 1.

The catalytic coated heating elements 28 and 36 are preferably electrically connected in series with a conventional thermostat 46 and with a voltage supply as shown in Figure 4. The thermostat 46 as shown in Figure 2 is located in heat exchange relationship with butter compartment 40. With this arrangement the thermostat completes a circuit for heating element 36 to heat the butter compartment when the temperature therein drops below a predetermined level. Since the heating element 28 is connected in series with heating element 36, it too is energized when thermostat 46 completes a circuit thereto. While a preferred circuit arrangement has been shown it will be apparent that various other circuit arrangements might be provided for heating elements 28 and 36. Thus, the heating element 28 might be connected in a circuit separate from heating element 36, and could be energized continuously in or response to switching means disassociated from heating element 36 and thermostat 46. Moreover, it is apparent that the construction of catalytic coated heating elements 28 and 36 might be varied. Thus, heating elements might be provided to indirectly heat a second element coated with a catalytic substance. It is also apparent that a heating element other than Nichrome wire and a catalyst other than platinum might be used providing the catalyst reacts with food odors to destroy the same.

While the form of embodiment of the invention as herein disclosed constitutes a preferred form, it is to be understood that other forms might be adopted, as may come within the scope of the claim which follows.

What is claimed is as follows:

In combination with a refrigerator having a cabinet and a food storage compartment, means for cooling said food storage compartment to normal food preserving temperatures, a second compartment for storing butter or the like associated with said food storage compartment, catalytic coated resistance wire heating means for heating said second compartment above the temperature of said food storage compartment, a catalytic coated resistance wire member associated with said food storage compartment and connected in electrical circuit relationship with said heating means, said catalytic member and heating means when heated having a characteristic of causing a reaction of oxygen with food odors in said food storage compartment and said second compartment to oxidize the same, and thermostatic switch means responsive to the temperature of said second compartment connected in series electrical circuit with said heating means and said catalytic member for limiting the heating sufficiently to prevent excessive heating of the second compartment and the food storage compartment.

References Cited in the file of this patent

UNITED STATES PATENTS

| | | |
|---|---|---|
| 96,871 | Blanchard | Nov. 16, 1869 |
| 2,068,435 | Rutishauser | Jan. 19, 1937 |
| 2,089,608 | Horlacher | Aug. 10, 1937 |
| 2,316,804 | Musher | Apr. 20, 1943 |
| 2,317,840 | Wild | Apr. 27, 1943 |
| 2,339,507 | Nagy | Jan. 18, 1944 |
| 2,463,143 | Brewer | Mar. 1, 1949 |
| 2,517,537 | Anderegg | Aug. 8, 1950 |
| 2,694,553 | Hicke et al. | Nov. 16, 1954 |
| 2,715,671 | Harrison | Aug. 16, 1955 |
| 2,784,662 | Grosz | Mar. 12, 1957 |
| 2,846,557 | Schulze et al. | Aug. 5, 1958 |